United States Patent [19]

Wada et al.

[11] Patent Number: 4,796,127
[45] Date of Patent: Jan. 3, 1989

[54] RECORDING HEAD SLIDER

[75] Inventors: Toshiaki Wada, Osaka; Mitsuhiko Furukawa; Massharu Shiroyama, both of Fukuoka; Michito Miyahara, Nakagawa; Mitsuyoshi Nagano, Saga; Shigeki Mohri, Tosu, all of Japan

[73] Assignees: Sumitomo Special Metals Co., Ltd., Osaka; Nippon Tungsten Co., Ltd., Fukuoka, both of Japan

[21] Appl. No.: 143,245

[22] Filed: Jan. 11, 1988

Related U.S. Application Data

[63] Continuation of Ser. No. 868,665, May 30, 1986, abandoned.

[30] Foreign Application Priority Data

Apr. 23, 1986 [JP] Japan ................... 61-093587

[51] Int. Cl.[4] .................................................. G11B 5/60
[52] U.S. Cl. ......................................... 360/103; 501/89
[58] Field of Search ............... 360/103, 102, 122, 110; 501/89, 92

[56] References Cited

U.S. PATENT DOCUMENTS

| 4,430,440 | 2/1984 | Wada et al. | 360/103 |
| 4,487,734 | 12/1984 | Sawamura | 501/92 |
| 4,489,484 | 12/1984 | Lee | 360/103 |
| 4,549,238 | 10/1985 | Ertingshausen et al. | 360/103 |
| 4,598,052 | 7/1986 | Wada et al. | 360/103 |
| 4,636,894 | 1/1987 | Mo | 360/103 |
| 4,639,803 | 1/1987 | Takeda et al. | 360/103 |
| 4,649,448 | 3/1987 | Nakajima | 360/103 |

FOREIGN PATENT DOCUMENTS

| 60-80185 | 5/1985 | Japan | 360/103 |
| 61-155261 | 7/1986 | Japan | 360/103 |

Primary Examiner—John H. Wolff
Assistant Examiner—Matthew J. Bussan
Attorney, Agent, or Firm—Burns, Doane, Swecker & Mathis

[57] ABSTRACT

A recording head slider comprises a slider body having a fluid bearing surface on a primary surface thereof and at least one transducer on at least one side of the slider body, the slider body being made of a sintered body produced by sintering a base composition consisting essentially of 10–40 percent by volume of silicon carbide and the balance being alumina. The base composition may comprise 0.2–10 percent by weight of sintering aids MgO, $Y_2O_3$, $ZrO_2$, CaO, $Er_2O_3$ and $Cr_2O_3$. This slider has high precision machinability and compatibility with recording media.

22 Claims, 4 Drawing Sheets

RECORDING HEAD SLIDER

This application is a continuation of application Ser. No. 868,665, filed on May 30, 1986, now abandoned.

BACKGROUND OF THE INVENTION

The present invention relates to recording/reproducing head slider suitable for magnetic heads, particularly thin film magnetic heads, to be used in computers, audio apparatus, video recorder or the like.

Generally, the sliders of the recording/reproducing (hereinafter represented simply by "recording") heads (i.e., transducing heads) for computers, audio apparatus, video recorders and the like have hitherto been manufactured of substrates of ferrites such as polycrystalline Ni-Zn ferrite, Mn-Zn ferrite or single crystalline Mn-Zn ferrite; and permalloy with a high hardness. With respect to the sliding-lubricating property with magnetic recording medium the ferrite type slider substrates have long been preferred.

Recent trends have been recognized in that the magnetic heads have become more and more of the thin film type in order to cope with the attempts to realize a higher recording density and a smaller size. Under such circumstances, various properties have recently been considered to be requisite for the magnetic head sliders. Among various properties, the sliding-lubricating property upon use (compatibility with recording media), wear resistance (durability of the magnetic heads), and additionally precision machinability and easy-to-process property (good machinability) upon manufacturing are considered to be essential. However, it has been recognized that the ferrite type sliders cannot meet the requirements for the wear resistance and the precision machinability.

More recently, some new types of sliders based on different materials have been proposed, among which, e.g., an $Al_2O_3$-TiC type slider (U.S. Pat. No. 4,251,841) is counted typical one. This $Al_2O_3$-TiC type slider is on the one hand superior to the ferrite type sliders with respect to the wear resistance and precision machinability but, on the other hand, inferior thereto with respect to the sliding-lubricating property resulting in a large wear on a corresponding surface of the recording media. The latter fact is counted to be serious drawbacks to be overcome.

Thus there is still much to be desired in the art in improving the recording head slider.

SUMMARY OF THE DISCLOSURE

It is a primary object of the present invention to provide a novel recording head slider having a good wear resistance of itself upon use, a good compatibility with recording media (namely a low deterioration in magnetic recording properties of the media upon use), and a good precision machinability upon manufacturing.

It is a further object of the present invention to provide a novel substrate of magnetic head slider which can meet the above requirements upon being further processed to a final product of a recording head slider.

Other objects of the present invention will become apparent in the entire disclosure.

According to one aspect of the present invention, there is provided a recording head slider comprising a slider body having a fluid bearing surface on a primary surface thereof and at least one transducer on at least one side of the slider body, the slider body being made of a sintered body produced by sintering a base composition consisting essentially of 10–40 percent by volume of silicon carbide and the balance being alumina.

According to a second aspect of the present invention there is provided a recording head slider substrate of a plate form having a main surface for applying a plurality of transducers on areas thereof assigned to slider bodies each to be cut off from the plate, the slider substrate being made of a sintered body produced by sintering a base composition consisting essentially of 10–40 percent by volume of silicon carbide and the balance alumina. The slider substrate may include the transducer having been applied on said side surface.

The transducer comprises preferably a thin film transducing circuit applied on the side of the slider body, preferably on the rear side thereof with respect to the moving direction of the recording medium.

The recording head slider of the present invention provides an excellent precision machinability upon manufacturing thereof superior to the conventional sliders, particularly of the ferrite or $Al_2O_3$-TiC type, and is suitable for the thin film magnetic head slider.

The precision machinability is required for preventing the slider body from chipping at the machined edge thereof upon groove machining and edge forming for the transducer base surface. Particular difficulty is encountered upon machining negative pressure producing type sliders, since the groove is not continuously open but closed at one end (rear end). Nevertheless the inventive slider substrate enables the machining with a desired precision as well as an easy machining. These features provide a significant advantage in mass production.

The inventive slider is also excellent upon its use. Namely, its excellent wear resistance is sufficiently great as compared with the $Al_2O_3$-TiC type slider which has been counted as having a high wear resistance, and, yet more, its sliding-lubricating property and read output characteristics are far superior to the $Al_2O_3$-TiC slider. These features provide on the one hand a prominent durability of the magnetic head itself, nevertheless, on the other hand, a prominent durability of the recording medium to which the magnetic head is applied due to a reduced damage caused by the head.

BRIEF DESCRIPTION OF THE DRAWINGS

The preferred embodiments of the present invention will be described hereinbelow with reference to the accompanying drawings, in which:

FIGS. 3(a) and (b) are enlarged views of a thin film transducer wherein FIG. 3(b) is a still enlarged partial sectional view taken along a line b—b in FIG. 3(a) while in FIG. 3(a) the protective larger 7 is eliminated (removed);

DESCRIPTION OF THE PREFERRED EMBODIMENTS

Based on the essential feature of the present invention various embodiments may be realized among which preferred embodiments will be described hereinbelow in more detail.

The recording head slider body is comprised of a specific sintered body having a specific composition based on the Al$_2$O$_3$-SiC type ceramics. For producing the slider, an intermediate product called a slider substrate of a plate form is prepared which is comprised of a continuous array of a number of slider bodies each may be typically provided with a transducer(s) just before separation into each discrete piece of sliders. Each piece of slider is cut off from the slider substrate (slider array) to be separated from each other to produce a primary surface assigned to the fluid bearing surface on one produced section perpendicular to the substrate plate (or transducer surface). The good precision machinability is essential in these stages.

Namely, the primary surface of the slider body is usually formed on one produced cut surface of the plate or disk of a sintered body, from which plate a number of pieces of slider bodies are produced. The slider substrate is usually cut into pieces after application of transducers.

The recording slider heads may be typically manufactured in the following steps. A sintered plate is machined and finished on its surfaces with requisite precisions at each step. One of flat surfaces of the plate is assigned as a surface on which a thin film transducer circuit is applied through known thin film techniques resulting in a grid like array of a number of to-be-cut-off sliders laterally arranged and superposed in a thickness direction of slider bodies which are just at a stage before cutting-off for separation. This intermediate product is generally called a magnetic head slider substrate as mentioned hereinbefore.

The fluid (usually air) bearing surface is provided on the primary surface of the slider body on the side to be directed to the surface of the recording medium (e.g., disk or the like). The bearing surface may comprise a positive and/or negative pressure producing surface(s). Usually a pair of positive pressure producing surfaces is provided on the laterally marginal areas of the primary surface. A negative pressure producing surface may be provided which is usually disposed on the central area of the primary surface and may be interposed between the pair of positive pressure producing surfaces.

Figure 1:
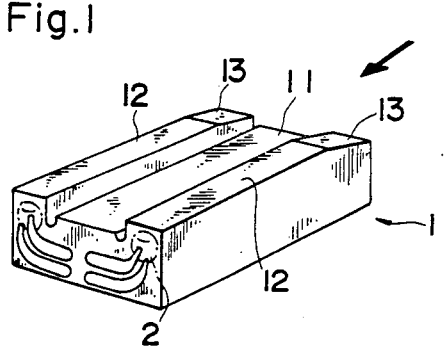
FIGS. 1 and 2 are perspective views showing embodiments of magnetic head sliders according to the present invention.

According to one embodiment, a pair of positive bearing surfaces 12 are formed on opposite sides intervening a groove 11. The positive bearing surface typically comprises a sloped or tapered (or crown-shaped) area 13 which opens so as to receive and guide air to the bearing surface 12 when a disk is rotated as shown in FIG. 1. The moving direction of air is designated by an arrow in FIGS. 1 and 2.

Figure 2:
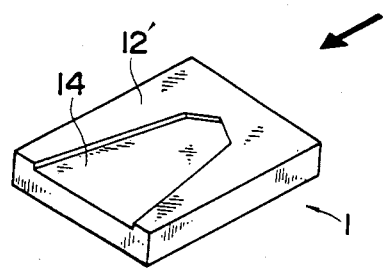

Another embodiment is shown in FIG. 2 which has a bearing surface 12' provided with a negative pressure producing, one side-closed groove 14 which opens at the front side along the air movement direction.

The grooving procedure requires a highest precision finishing with a lowest chipping thus, substantially, no chipping is required. By the same token, the grooving also requires a good precision machinability.

The presence of SiC serves to provide the compatibility (or affinity) and sliding-lubricating property with the recording medium as well as to improve the heat dissipating ability of the thin film head by raising the thermal conductivity to 0.05–0.10 cal/cm.sec.° C. The good heat dissipating ability is required for dissipating heat generated by the transducer due to its operation with high frequency. The SiC presence also enables an easy precision machining upon producing a magnetic head slider. An amount of SiC below 10 percent by volume provides a poor precision machining effect caused by occurrence of chipping at the edge portion of the slider (like groove edge or edge of a cut-off surface) as compared with ferrite and a poor improvement in the sliding-lubricating property compared with an alumina sintered body. On the other hand at an amount exceeding 40 percent by volume, the sinterability deteriorates entailing a number of pores in the resultant sintered body, which further requires an elevated sintering temperature for completing the sintering. However at an elevated sintering temperature (e.g., exceeding about 1900° C.) an excess grain growth occurs in the alumina crystal grains which further brings about chipping at the machined edges. Thus the amount of SiC should be limited to 10–40 percent by volume of the entire base composition. Based on the similar consideration SiC preferably amounts to 15–35 percent by volume (i.e., the balance being alumina). In the base composition alumina usually amounts to at least 60 percent by volume.

The base composition may (and preferably, too) contain sintering aids as above mentioned in an amount of 0.2–10 percent by weight of the entire composition. The presence of the sintering aids improves the sinterability of the Al$_2$O$_3$-SiC base structure components resulting in a fine crystal grain of alumina as well as a further improved precision machinability. However, below 0.2 percent by weight of the sintering aids such effects are insufficient and the strength of the sintered body does not become sufficiently high due to an insufficient sintering or densification. On the other hand at an amount exceeding 10 percent by weight thereof, the strength and hardness of the sintered body is reduced markedly, besides, resulting in a poor dimensional precision of the finished sliders.

The starting material for SiC may be of the alpha- or beta type available in powder form. The starting material for ZrO$_2$ as one of the sintering aids, may be a non-stabilized zirconia powder including no stabilizer or partially or entirely stabilized zirconia powder stabilized by stabilizers such as Y$_2$O$_3$, MgO, Cr$_2$O$_3$, CaO and/or the like. However, where the nonstabilized zirconia powder is used, it is preferred to employ a powder such that has a purity of 99.9% by weight or more, an average particle size of 0.1 $\mu$m or less and a final resultant crystal structure of the tetragonal and cubic crystal type. This provision provides an improved structure of the sintered body, whereby the resultant sintered body has a very fine, homogeneous crystal grain size, a high density without pores larger than 1 $\mu$m and a high strength. Also, the compatibility and sliding-lubricating property with the recording medium, wear resistance and machinability can be improved as a thin film magnetic head slider. On the case where partially or entirely stabilized zirconia powder is used as the starting material, such ones including 7–15 mole percent of the sintering aids (particularly Y$_2$O$_3$ is preferred) with impurities not exceeding 0.1% by weight and an average particle size not exceeding 0.3 $\mu$m is preferred in order to improve the structure and strength.

With respect to the precision machinability the average crystal grain size of the sintered body should not exceed 2 $\mu$m, preferably 1.5 $\mu$m. Above 2 $\mu$m the chipping easily occurs, and the surface properties such as flatness and smoothness, and roughness of the finished surface deteriorate, thus unpreferred. As to SiC, it is preferred to have a grain size of 2 $\mu$m or less, more preferred 1 $\mu$m or less and most preferred 0.5 $\mu$m or less. If the SiC grain becomes large, the toughness decreases. It is possible to make slider substrates and sliders which include no large chipping such that affects the quality of sliders.

It is preferred for the sintered body to have a relative density, against the theoretical density, of at least 98 percent (more preferred is at least 99 percent). The density also markedly affects the machining precision and also affects the sliding-lubricating property with the recording medium in conjunction with the crystal grain size. Besides the surface on which the transducer is to be applied should be as flat as possible and have no pore of a size affecting the quality.

The coefficient of thermal expansion of this sintered body is about $8 \times 10^{-6}/°C$. (at room temperature to 500° C.) thus ensuring a good matching with the thin film circuit of the transducer as well as a high resistance to peeling off upon vapor deposition of insulating or protective layers.

The sintered body has a relatively low specific electric resistance of the level $10^6$ $\Omega$-cm which is convenient for thin film formation such as sputtering or the like.

The sintered body for slider may be produced through various methods. Typical methods will be disclosed herein below. First, a material composition is prepared by weighing materials with predetermined purities and mixing (or additionally pulverizing), then compacted and sintered generally through press-sintering, e.g., hot-pressing (HP) or hot isostatic pressing (HIP) resulting in a sintered body.

The sintering may be carried out at a pressure of at least 150 kgf/cm$^2$ and at a temperature of 1700°–1900° C. by HP, and at a pressure of at least 1000 kgf/cm$^2$ and at a temperature of 1500°–1700° C. by HIP. Where HIP is applied, a presintering is preferred up to a relative density of 90% or more. The sintering atmosphere may be nonoxidizing one, e.g., inert gas. Sintering may be carried out for a predetermined period of time so as to achieve a desired density, however, usually for at least 30 minutes to obtain a plate like sintered body.

The resultant sintered body is subjected to precision machining and finishing through grinding and polishing etc. to form substrate plates with a surface (constituting the main surface for applying the transducers) with a predetermined precision. On one of the side surfaces thereof thin film transducer is formed at a defined location corresponding to each piece of the slider body, thus resulting in a magnetic head slider substrate. In order to bring it to a final product of head slider, each slider body is separated through cutting from the substrate (continuous array of slider bodies) by a grinding cutter as mentioned before.

The term "slider substrate" embraces such an intermediate product which has been half finished and at least such ones that has and is capable of providing a sufficient surface precision through precision machining and finishing. The slider substrate may or may not include the transducer.

Some examples of the thin film magnetic head sliders are illustrated in FIGS. 1 and 2. FIG. 1 shows ones of the positive pressure producing type while FIG. 2 shows ones of the negative pressure producing type. The numeral 1 designates a slider, while 2 a thin film transducer formed on the axially rear side of the slider body. The arrow designates the direction of movement of a recording medium (e.g., disk), i.e., that of accompanied air flow.

Figure 3:
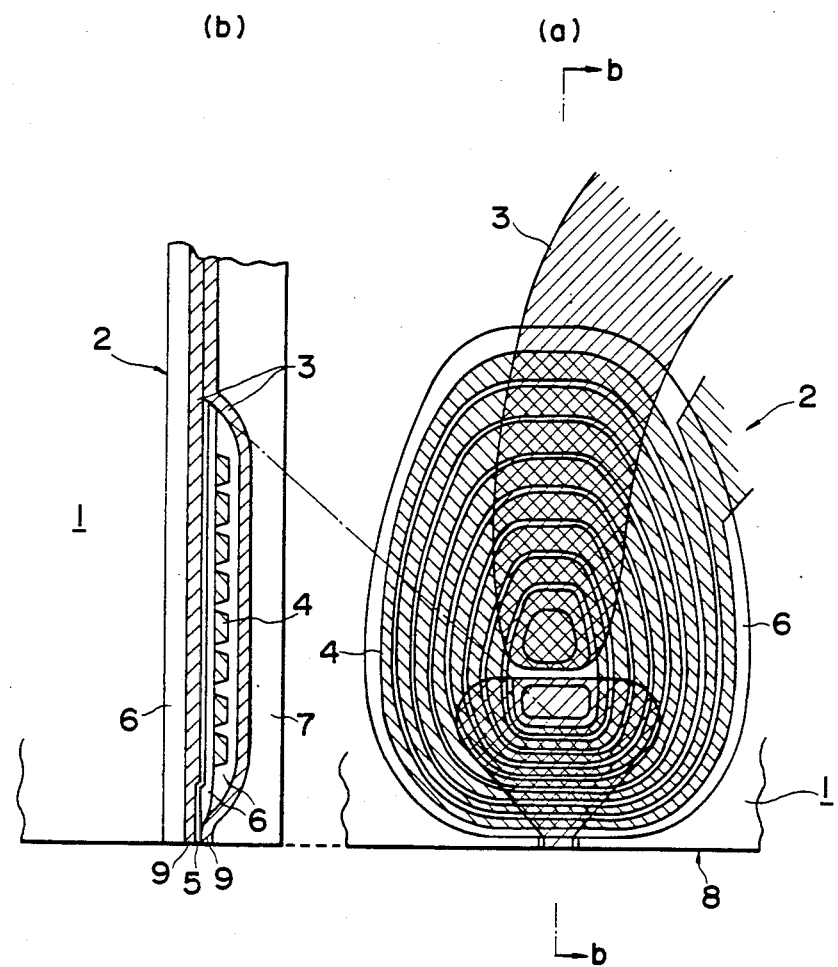

In FIGS. 3(a) and (b) an example of the thin film transducer is disclosed which comprises magnetic layers 3, conductor turns 4, a gap 5, insulating layers 6, a protective layer (insulating layer) 7, a bearing surface 8, and magnetic pole tips 9. FIG. 3(a) illustrates an intermediate surface exposed by uncovering the protective layer 7 of FIG. 3(b) which is an enlarged sectional view taken along a line b—b of FIG. 3(a).

EXAMPLES (1) Manufacturing magnetic head sliders

Two compositions A and B as below were prepared by weighing and mixing starting material powders of Al$_2$O$_3$ having a purity of 99.9% and an average powder particle size of 0.6 $\mu$m; SiC having a purity of 98.0% and an average powder particle size of 0.4 $\mu$m; and ZrO$_2$ and MgO each having a purity of 99.0 % and an average powder particle size of 0.5 $\mu$m (purity: by weight %):

A composition comprises: a mixture of 20% by volume of SiC and 80% by volume of Al$_2$O$_3$ and 0.5% by weight of MgO relative to the entire composition.

B composition comprises: a mixture of 20% by volume of SiC and 80% by volume of Al$_2$O$_3$ and 0.5% by weight of MgO and 4% by weight of ZrO$_2$ relative to the entire composition.

The resultant compositions A and B were wet milled and pulverized in a ball mill with a rubber lining for 20 hours. The resultant powder for sintering was charged in a carbon mold and sintered by hot pressing in an argon atmosphere under application of a pressure of 200 kgf/cm$^2$ each by keeping temperature at 1500° C. and 1800° C. for 1 hour, then pressure was released and allowed to cool resulting in sintered bodies with a size of 50 mm square $\times$5.5 mm.

The characteristics for the sintered bodies A and B for use in the slider are shown in Table 1 together with those of conventional 70Al$_2$O$_3$-30TiC (% by weight).

TABLE 1

| | A | B | Al$_2$O$_3$—TiC |
|---|---|---|---|
| specific gravity | 3.82 | 3.93 | 4.25 |
| hardness HrA | 94.0–94.5 | 94.0–94.5 | 93.5–94.5 |
| bending strength kg/mm$^2$ | 50 | 50 | 80 |
| cal/cm · s · °C. | 0.05 | 0.06 | 0.04 |
| average crystal grain size* ($\mu$m) of sintered body | 1.0 | 1.0 | — |
| average crystal grain size ($\mu$m) of Al$_2$O$_3$ | 1.5 | 1.5 | — |
| relative density % | 99.8 | 99.8 | — |

*including Al$_2$O$_3$ and SiC (2) Evaluation tests of the magnetic head sliders (2.1) Precision machinability The sintered bodies obtained at (1) were subjected to cutting test by observing fine chipping occurring at edges produced by cutting with a diamond cutting grinding wheel. As comparison samples a conventional ferrite material (Mn-Zn polycrystalline ferrite: 32% MnO, 15% ZnO, 53% Fe$_2$O$_3$, by weight) and a 70Al$_2$O$_3$-30TiC sintered body as aforementioned were tested, too. The chipping tests were conducted by using a resin bonded grinding wheel (dicing cutter with diamond abrasives of 30 $\mu$m) with a width of 0.28 mm and a diameter of 52 mm at a rotational speed of 30,000 rpm, a depth of cutting of 0.3 mm and a rate of feed of 5 mm/sec. The results are shown together in Table 2. The chipping not exceeding 2 μm does not substantially affect the quality of the slider and counted as satisfactory while a large chipping like ferrite deteriorates the quality.

TABLE 2

| material | chipping depth (μm) |
|---|---|
| ferrite | ≧10 |
| Al₂O₃—TiC | ≦1 |
| A | ≦2 |
| B | ≦2 |

As is appreciated by Table 2, the sintered bodies A and B for the inventive slider exhibit an excellent precision machinability superior to ferrite and also have been improved over the Al₂O₃-TiC sintered body. Namely, the sintered bodies A and B are most suited for the thin film magnetic head slider which requires a highest precision machinability.

(2.2) Wear resistance test

The aforementioned sintered bodies A and B were cut into rectangular parallelopipedons of 2 mm×4 mm section x 20 mm length by a diamond grinding wheel, and one end thereof was tapered to form a blade like pin with an acute angle.

(2.3) General evaluation

Figure 5:
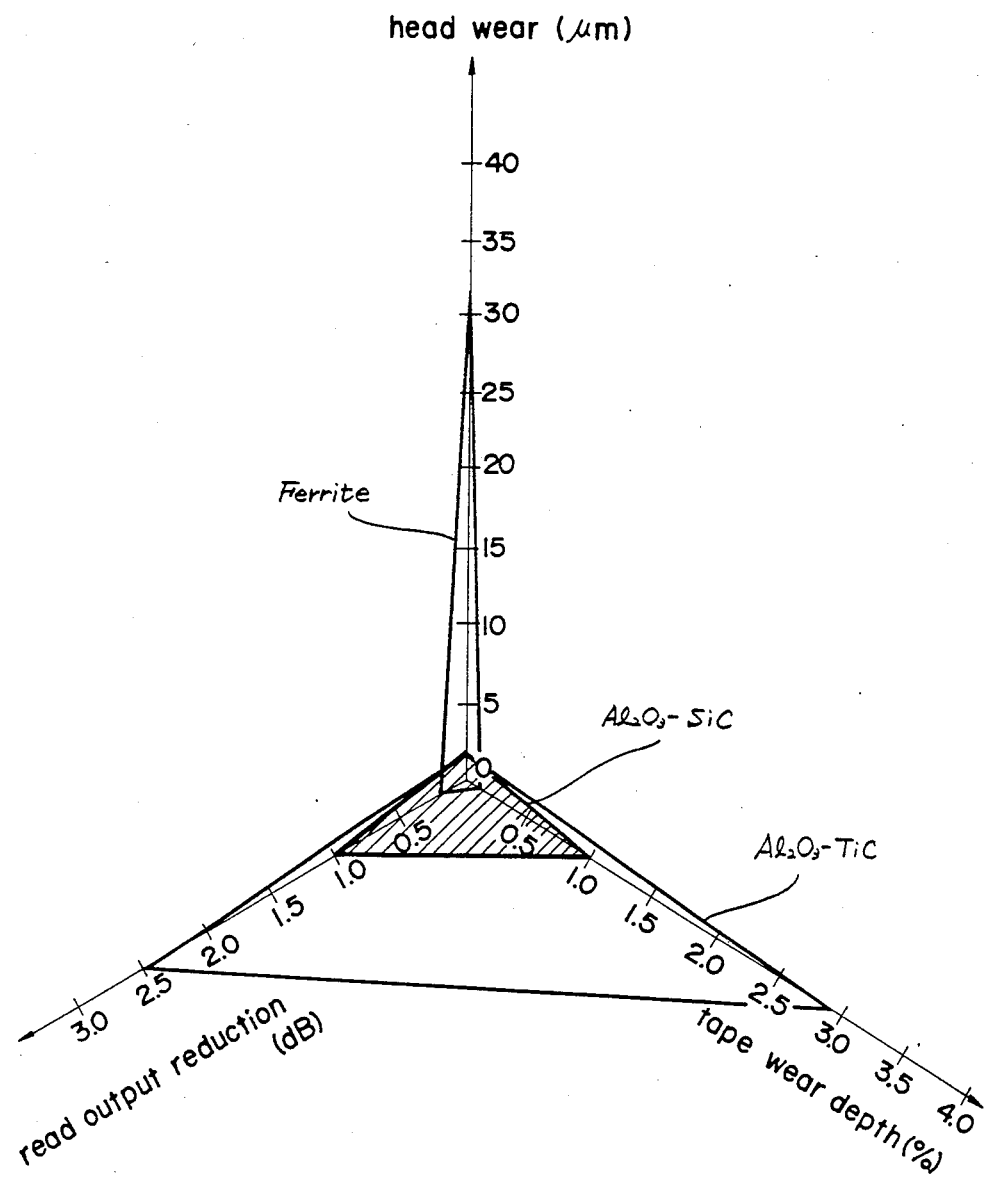
FIG. 5 is a graphic representation showing the general evaluation of the magnetic head sliders.

In FIG. 5 the general evaluation is illustrated by comparing three material factors requisite for the magnetic head slider, i.e., wear of the recording medium (tape), lowering of read output of the recording medium (tape), and wear of the slider itself. Note, although the testings were carried out using a magnetic recording tape and an slider (rod) edge (as depicted as "head war") abutting to the running tape with sliding contact, the test results are believed to generally represent the characteristics of the slider in association with the recording disk or the like magnetic recording media.

As appreciated by FIG. 5, the inventive slider of the Al₂O₃-SiC type has eliminated the drawbacks occurred in the conventional ferrite and Al₂O₃-TiC sliders, namely, significant reduction is achieved in the tape wear and read output lowering in contrast to the Al₂O₃-TiC slider, as well as significant reduction in the head wear (slider wear) is achieved in contrast to the ferrite sliders. In other words, the inventive slider possess intermediate characteristics between those of the ferrite slider and the Al₂O₃-TiC slider such intermediate characteristics are considered to be best suited for the slider. Besides a ferrite disk of the doughnut shape was prepared into a dimension of a 45 mm outer radius × a 10 mm inner radius × a 10 mm thickness. So-called pin-disk type wear testings were conducted by rotating the disk abutting the pin blade onto the surface of the rotating disk. Comparison testings were also conducted for sample pins of ferrite and Al₂O₃-TiC, respectively.

The results are shown in Table 3 below.

TABLE 3

| material | hardness HrA | wear of pin (mm) | wear of disk (mg) |
|---|---|---|---|
| ferrite | 85.0–85.5 | 0.24–0.26 | 6–10 |
| Al₂O₃—TiC | 93.5–94.5 | 0.04–0.06 | 100–130 |
| A | 94.0–94.5 | 0.05–0.10 | 30–50 |
| B | 94.0–94.5 | 0.05–0.08 | 30–50 |

As appreciated by Table 3, the inventive sintered bodies for slider substrates A and B exhibit a low wear comparable to Al₂O₃-TiC, which fast demonstrates an excellent wear resistance and a long durability as the head slider. With respect to the wear of disk, the pin samples A and B exhibit values only about a third of Al₂O₃-TiC while slightly inferior to ferrite. Namely, the inventive slider has an excellent compatibility and sliding-lubricating property with the recording media.

(2.4) Read output characteristics

Shoe shine testings were conducted by using a rod sample of a square section (3×3 mm square ×15 mm length) which had been precision finished and had a sharp edge at the beginning for measuring lowering in the read output.

The shoe shine testings were made under the following conditions:

Sample tape: IBM CrO₂ tape
Tension of the tape: 550 g
Tape running speed at: 1.9 m/sec (75 ips)
One pass of tape: 1 m, and
Testing machine: TD-1502 by NEC.

Figure 4:
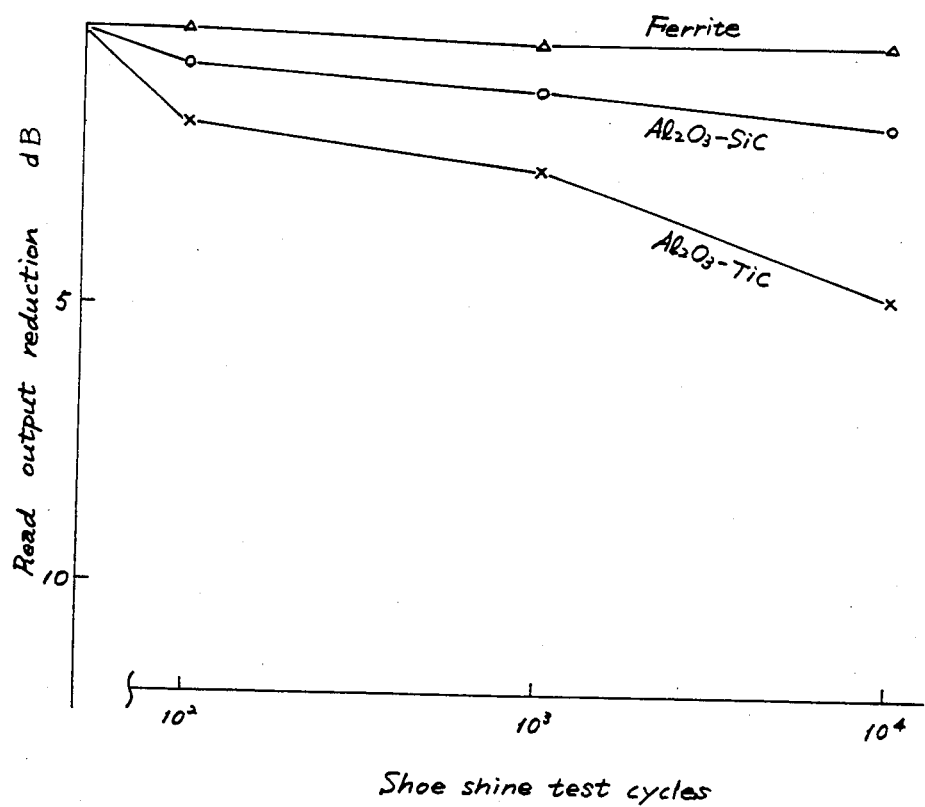
FIG. 4 is a graph showing the test result of the shoe shine testing.

The results are shown in FIG. 4. Besides similar comparison testings were made by using the ferrite and Al₂O₃-TiC materials and the results are also shown therein.

As appreciated by FIG. 4 the inventive samples exhibit significantly small lowering in the read output as contrasted to the comparison samples.

It should be understood that modifications may be done without departing from the gist of the present invention herein disclosed and claimed below.

We claim:

1. A recording head slider comprising a slider body having a fluid bearing surface on a primary surface thereof and at least one transducer on at least one side of the slider body, the slider body being made of a sintered body produced by sintering a base composition consisting essentially of 10–40 percent by volume of silicon carbide and the balance being alumina, whereby a sintered body having excellent wear resistance and machinability is obtained.

2. The recording head slider as defined in claim 1, wherein said base composition further comprises 0.2–10 percent by weight, calculated on the entire composition, of at least one of sintering aids selected from the group consisting of MgO, Y₂O₃, ZrO₂, CaO, Er₂O₃ and Cr₂O₃.

3. The recording head slider as defined in claim 1, wherein the transducer comprises a thin film circuit.

4. The recording head slider as defined in claim 1, wherein the fluid bearing surface comprises at least one positive pressure producing surface.

5. The recording head slider as defined in claim 1, wherein the fluid bearing surface comprises a negative pressure producing surface.

6. The recording head slider as defined in claim 4, wherein the fluid bearing surface includes a pair of positive pressure producing surfaces disposed on the marginal area of the primary source.

7. The recording head slider as defined in claim 5, wherein the negative pressure surface is disposed on the central area of the primary surface.

8. The recording head slider as defined in claim 6, wherein the fluid bearing surface further includes a negative pressure producing surface disposed between the pair of the positive pressure producing surfaces.

9. The recording head slider as defined in claim 1, wherein the base composition comprises 15-35 percent by volume of silicon carbide.

10. The recording head slider as defined in claim 2, wherein the sintering aid is at least one of MgO and $ZrO_2$.

11. The recording head slider as defined in claim 1, wherein the slider body has a density of at least 98% relative to the theoretical density.

12. The recording head slider as defined in claim 11, wherein the slider body has an average crystal grain size not exceeding 2 μm.

13. The recording head slider as defined in claim 12, wherein the slider body has a thermal conductivity of at least 0.05 cal/cm.sec.° C.

14. A recording head slider substrate of a plate form having a main surface for applying a plurality of transducers on areas thereof assigned to slider bodies to be cut off from the plate, the slider substrate being made of a sintered body produced by sintering a base composition consisting essentially of 10-40 percent by volume of silicon carbide and the balance being alumina.

15. The recording head slider substrate as defined in claim 14, wherein said base composition further comprises 0.2-10 percent by weight, calculated on the entire composition, of at least one of sintering aids selected from the group consisting of MgO, $Y_2O_3$, $ZrO_2$, CaO, $Er_2O_3$ and $Cr_2O_3$.

16. The recording head slider substrate as defined in claim 14, wherein the at least one transducer has been applied on said side surface.

17. The recording head slider substrate as defined in claim 16, wherein the transducer comprises a thin film circuit.

18. The recording head slider substrate as defined in claim 14, wherein the base composition comprises 15—35 percent by volume of silicon carbide.

19. The recording head slider substrate as defined in claim 15, wherein the sintering aid is at least one of MgO and $ZrO_2$.

20. The recording head slider substrate as defined in claim 14, wherein the slider body has a density of at least 98% relative to the theoretical density.

21. The recording head slider substrate as defined in claim 20, wherein the slider substrate has an average crystal grain size not exceeding 2 μm.

22. The recording head slider substrate as defined in claim 21, wherein the slider body has a thermal conductivity at least 0.05 cal/cm.sec.° C.

* * * * *